United States Patent [19]

Ooi et al.

[11] Patent Number: 4,685,142
[45] Date of Patent: Aug. 4, 1987

[54] METHOD AND DEVICE FOR HANDWRITTEN LETTER RECOGNITION

[75] Inventors: Katsunori Ooi, Yokohama; Yutaka Hidai, Kodaira; Yoshiaki Kurosawa, Yokohama; Yoshikatsu Nakamura, Yokosuka, all of Japan

[73] Assignee: Kabushiki Kaisha Toshiba, Kawasaki, Japan

[21] Appl. No.: 721,906

[22] Filed: Apr. 10, 1985

[30] Foreign Application Priority Data

Apr. 12, 1984 [JP] Japan ................................. 59-73422

[51] Int. Cl.⁴ .............................................. G06K 9/64
[52] U.S. Cl. ...................................... 382/13; 382/24; 382/33; 382/59
[58] Field of Search ...................... 382/13, 24, 56, 59, 382/33; 178/18-20

[56] References Cited

U.S. PATENT DOCUMENTS

| 4,317,109 | 2/1982 | Odaka et al. | 382/13 |
| 4,542,526 | 9/1985 | Satoh et al. | 382/13 |
| 4,561,105 | 12/1985 | Crane et al. | 382/13 |

OTHER PUBLICATIONS

T. Wakahara et al., "Stroke-Number and Stroke-Order Free On-Line Character Recognition by Selective Stroke Linkage Method", Proc. ICTP, 1983, pp. 157-162.

Primary Examiner—Leo H. Boudreau
Attorney, Agent, or Firm—Schwartz, Jeffery, Schwaab, Mack, Blumenthal & Evans

[57] ABSTRACT

A handwritten letter recognition method in accordance with the present invention detects, for each subset, input strokes that coincide with the standard strokes, according to the order of the standard strokes of a standard pattern, and carries out in turn the coincidence processing of strokes by removing the coincident input strokes from the input pattern. The recognition processing for the input patterns is carried out by extracting the standard patterns possessing standard strokes that are coincident for all of the strokes of the input pattern. Therefore, it becomes possible to recognize the input letter pattern easily and efficiently without regard to the order of the strokes input, and even for an input letter pattern with large number of strokes. Moreover, the coincidence detection processing of the strokes can be executed easily and accurately even for the case when the number of strokes that form a letter patterns is large or the case of complicated pattern form, since it detects input strokes that will coincide next, by removing the input strokes that are detected as coincident from the input pattern, to extract a standard pattern all of whose strokes coincide for each and every subset.

7 Claims, 24 Drawing Figures

| STROKE | TYPE | X COORDINATE | | | Y COORDINATE | | |
|---|---|---|---|---|---|---|---|
| | | START | MIDDLE | TERMINAL | START | MIDDLE | TERMINAL |
| ① | B | 1 | 2 | 3 | 4 | 6 | 7 |
| ② | A | 3 | 3 | 2 | 7 | 3 | 1 |
| ③ | A | 2 | 1 | 1 | 2 | 4 | 4 |
| ④ | D | 4 | 4 | 4 | 3 | 5 | 5 |
| ⑤ | A | 7 | 6 | 6 | 8 | 8 | 8 |
| ⑥ | A | 5 | 5 | 5 | 5 | 2 | 3 |
| ⑦ | B | 6 | 7 | 8 | 6 | 7 | 6 |
| ⑧ | D | 8 | 8 | 7 | 1 | 1 | 2 |

| STROKE | TYPE | X COORDINATE | | | Y COORDINATE | | |
|---|---|---|---|---|---|---|---|
| | | START | MIDDLE | TERMINAL | START | MIDDLE | TERMINAL |
| ① | A | 1 | 1 | 1 | 6 | 6 | 5 |
| ② | D | 4 | 3 | 4 | 5 | 7 | 4 |
| ③ | B | 2 | 2 | 2 | 4 | 5 | 6 |
| ④ | B | 3 | 4 | 3 | 2 | 2 | 8 |
| ⑤ | A | 5 | 5 | 5 | 8 | 3 | 2 |
| ⑥ | D | 6 | 8 | 8 | 7 | 8 | 1 |
| ⑦ | C | 7 | 6 | 6 | 3 | 4 | 7 |
| ⑧ | B | 8 | 7 | 7 | 1 | 1 | 3 |

| STROKE | TYPE | X COORDINATE | | | Y COORDINATE | | |
|---|---|---|---|---|---|---|---|
| | | START | MIDDLE | TERMINAL | START | MIDDLE | TERMINAL |
| ① | A | 2 | 1 | 1 | 3 | 3 | 2 |
| ② | B | 1 | 2 | 3 | 2 | 2 | 3 |
| ③ | D | 3 | 3 | 2 | 1 | 1 | 1 |

FIG. 9

| LETTER CODE | START MIN X | MID MIN X | | | |
|---|---|---|---|---|---|
| B C | | | $Y_{11}$ | | |
| A B | | | $Y_{12}$ | | |
| | | | $Y_{13}$ | | |
| --- | --- | --- | --- | | |
| | $X_{11}$ | | | | |
| | $X_{12}$ | | | | |
| | $X_{13}$ | | | | |

FIG. 11

| ① | UPPERMOST OF THE HORIZONTAL STROKES |
| --- | --- |
| ② | LOWERMOST OF THE HORIZONTAL STROKES |
| ③ | MOST LEFTWARD OF THE VERTICAL STROKES |
| ④ | MOST LEFTWARD OF THE VERTICAL STROKES |
| ⑤ | LOWERMOST OF THE HORIZONTAL STROKES |

FIG. 12

| LETTER | | COAD | |
| --- | --- | --- | --- |
| A D | MID | MIN | X |
| B C | MID | MAX | Y |
| A D | MID | MIN | X |

| $X_{11}$ | $Y_{11}$ |
| --- | --- |
| $X_{12}$ | $Y_{12}$ |
| $X_{13}$ | $Y_{13}$ |

METHOD AND DEVICE FOR HANDWRITTEN LETTER RECOGNITION

BACKGROUND OF THE INVENTION

1. Field of the Invention

The present invention relates to a method and a device for recognizing handwritten letters which is capable of readily recognizing a handwritten letter that is input by writing through a coordinate inputting device, without regard to the order of strokes of the letter.

2. Description of the Prior Art

In the recent years there have been proposed various kinds of handwritten letter recognition devices for recognizing handwritten letters. The letters are input by writing on a coordinate inputting device such as tablet device by utilizing information on the strokes. Data on the letters is input that represent the handwritten letters into a computer or the like by encoding the data. In one example of the prior art recognition device, a letter pattern, which is input by writing on a letter inputting section consisting of a coordinate inputting device, is fed to a pre-processing section, and after applying to it such preliminary processings as removal of input noise and normalization of the letter size, stroke information on the input letter pattern is extracted at a characteristics extraction section. Then, the information on the stroke characteristic which represents the input letter pattern is matched in a matching section with stroke information for each standard pattern in the recognition object categories that have been registered in advance in a standard pattern dictionary, to find the degree of similarity, distance, and others between the input letter pattern and each of the standard patterns. The information on the degree of similarity and the distance thus found for each one of the standard patterns is evaluated at the discrimination section to obtain the result of recognition for the input letter pattern as a recognition object category.

Now, the input letter pattern discussed above is given as a sequence of strokes that are written on the tablet surface, and the order of strokes may be different from the regular order of strokes. Because of this, it was necessary to carry out a very large collating computation if the input strokes were to be collated with all of the standard strokes of the standard patterns. therefore, in the past a correspondence has been established on the table between the strokes in the dictionary and the strokes that are input by writing, and the collating was carried out between the strokes that are in such a correspondence relationship. However, in the case of a large number of strokes in the input pattern, finding a correspondence relationship itself between the strokes becomes difficult, and hence there used to be a problem that the efficiency of the recognition processing was unsatisfactory.

SUMMARY OF THE INVENTION

An object of the present invention is to provide a method and a device for recognizing a handwritten letter which is capable of efficiently recognizing the pattern of a letter that is input by writing, without regard to the order of inputting of the strokes.

Another object of the present invention is to provide a method and a device for recognizing a handwritten letter which is capable of easily and efficiently recognizing a complicated input pattern of a letter with large number of strokes.

One of the features of the present invention is to carry out the recognition processing according to the scheme, as follows. Namely, along with the standard patterns of the recognition object categories, there are registered in a standard pattern dictionary of the characteristics of the standard strokes. By reading the characteristics of the standard strokes from the standard pattern dictionary the input strokes that coincide with the standard strokes are detected. Then, the coincidence detection between the standard strokes and the input strokes is carried out in turn, while removing the input strokes that are detected as coincident from among those in the input pattern. Based on the results of the detection, a standard pattern with standard strokes that coincide with all of the input strokes is extracted, and the recognition of the input pattern is arranged to be accomplished by collating the standard pattern with the input pattern. In other words, the input strokes are rearranged in accordance with the order of the standard strokes that are registered in the standard pattern dictionary, and by so doing it is arranged that the recognition processing is to be carried out for only each of the pairs of strokes with correspondence between them.

BRIEF DESCRIPTION OF DRAWING

These and other objects, features and advantages of the present invention will be more apparent from the following description of a preferred embodiment, taken in conjunction with the accompanying drawings, in which.

DESCRIPTION OF THE PREFERRED EMBODIMENTS

To facilitate an understanding of the present invention, a brief reference will be made to a prior art letter recognition device illustrated in FIG. 1.

The prior art letter recognition device includes a letter inputting section 2 which consists of a coordinate inputting device. A letter pattern which is input by writing through the letter inputting section 2 is led to a pre-processing section 4, and after applying preliminary processings such as removal of input noise and normalization of the letter size, the characteristics of the stroke information on the input letter pattern are extracted at a characteristics extraction section 6. Then, the characteristics information on the strokes that represent the input letter pattern and the stroke information of each of the standard patterns of the recognition object categories that are registered in advance in a standard pattern dictionary 8 are matched at a matching section 10, to find the degree of similarity and the distance between the input letter pattern and each of the standard patterns. The information on the degree of similarity and the distance thus found for each one of the standard patterns is evaluated at a discrimination section 12 to obtain a recognition result for the input letter pattern as a recognition object category.

Figures 1, 2:
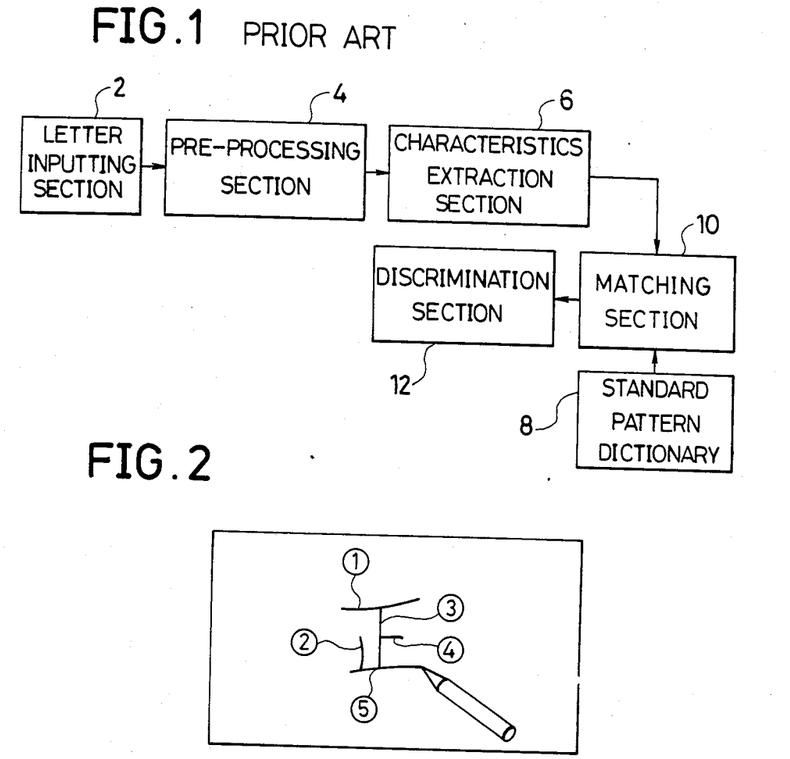
FIG. 1 is a simplified block diagram of a prior art letter recognition device.
FIG. 2 is a diagram which shows the input pattern that is input by writing.
Figure 3:
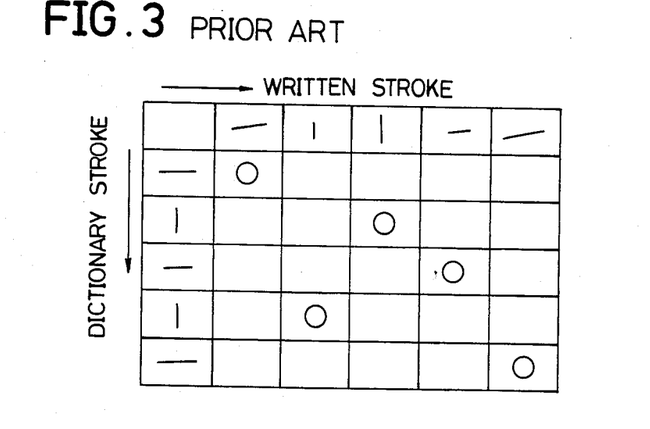
FIG. 3 is a diagram which shows an example of the prior art stroke collation.

Now, the input letter pattern is given, for example, as a sequence of strokes written on the tablet surface, as shown by FIG. 2. The order of strokes of the input letter pattern may be different from the normal order of strokes. Because of this, it will become necessary to carry out an extremely huge amount of collation computation if it is arranged to collate the input strokes in the order of inputting, with all of the standard strokes in the standard patterns. Therefore, in the past a corresondence was established in a table between the strokes in the dictionary, for example, of a Chinese character "sei," as shown in FIG. 3, and the strokes that are input by writing. The collation is processed then between the strokes that are in the correspondence relationship. However, in a case where there are a large number of strokes in the input pattern, finding a correspondence relationship itself between the strokes becomes a difficult task, and hence there used to be a problem that the efficiency of the recognition processing was poor.

The present invention solves the problem mentioned above, and an embodiment of the invention will be described by referring to FIGS. 4 to 15.

Figure 4:
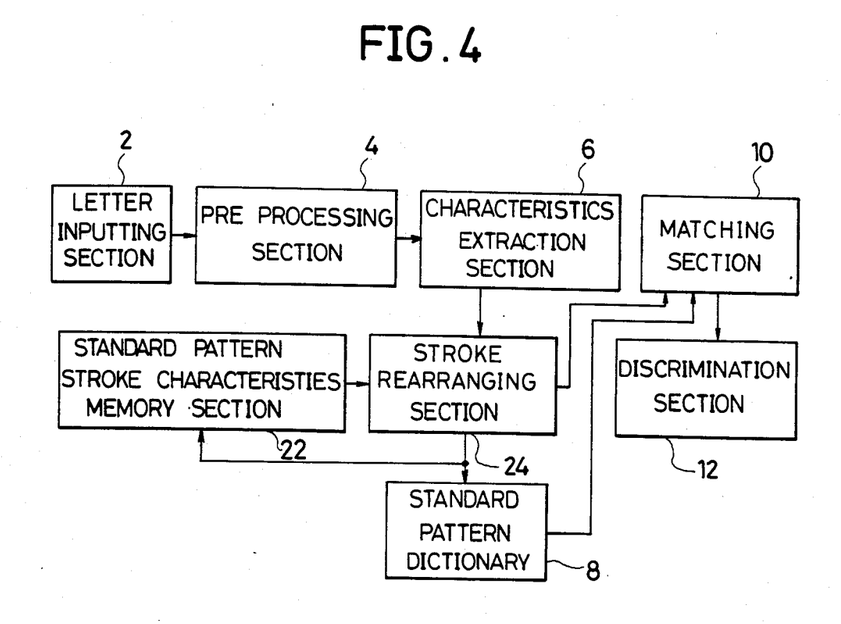
FIG. 4 is a simplified block diagram for a letter recognition device embodying the present invention.

A letter recognition device embodying the present invention is shown in FIG. 4. It is to be noted in this embodiment that elements identical to those in the prior art device as shown in FIG. 1 will be assigned identical numerals to omit further explanation. A special feature of the device for the embodiment is to register, in the standard stroke characteristics memory section 22, information on the characteristics of each of the written strokes corresponding to each standard pattern of the recognition object categories that are registered in the standard pattern dictionary 8, by classifying the information for each subset. Then, in accordance with the information on the characteristics of the strokes, the inputting order of the input strokes of the input pattern is reconstructed for every subset at a stroke rearranging section 24 to conform with the order of strokes of the standard pattern. The letter recognition processing is to be carried out finally between the input pattern and the standard pattern for which correspondence has been established for all the strokes.

Figure 5:
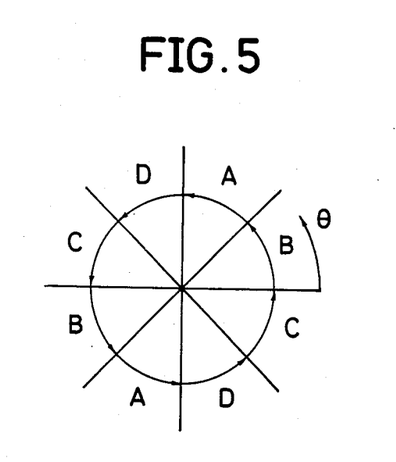
FIG. 5 is a diagram which illustrates an example of classifying stroke directions that shows the characteristics of the strokes.

Namely, the characteristics of the input letter pattern that was input through the letter inputting secton 2 are extracted at the characteristics extraction section 6. The characteristics of the input letter pattern that are extracted at the characteristics extraction section 6 include, for example, the direction of the written stroke and the position coordinates of the starting point, midpoint, and terminal point of each written stroke. In this case, the number of strokes of the input letter pattern may also be extracted as one item of the characteristics information. The direction of a writtten stroke may be defined, for example, as the inclination of the line which joins the starting point and the terminal point for each stroke written, and may be represented, as shown in FIG. 5, by partitioning and classifying the angle of inclination of the stroke. In this embodiment, the written stroke is classified into four types: A, B, C, and D corresponding to the angle of inclination. Then, each of the written strokes is represented by information on the classification and the position coordinates of the starting point, midpoint, and terminal point of the written stroke.

Figure 6A:
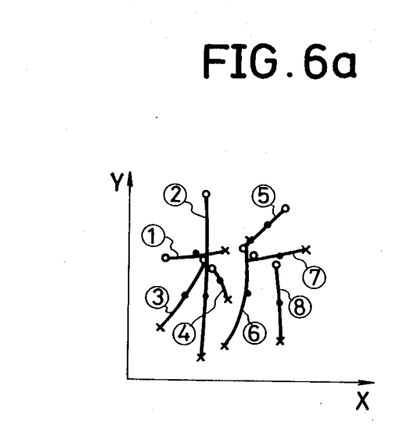
FIGS. 6a and 6b, FIGS. 7a and 7b and FIGS. 8a and 8b are diagrams which illustrate the input patterns and the information on the characteristics of the input strokes.
Figure 6B:
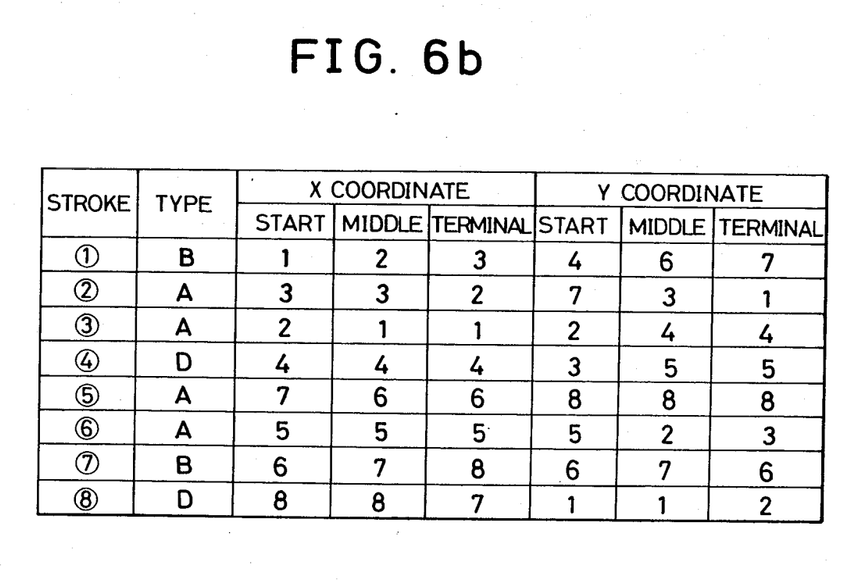
Figure 7A:
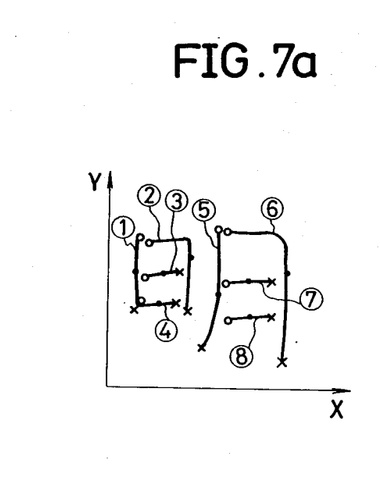
Figure 7B:
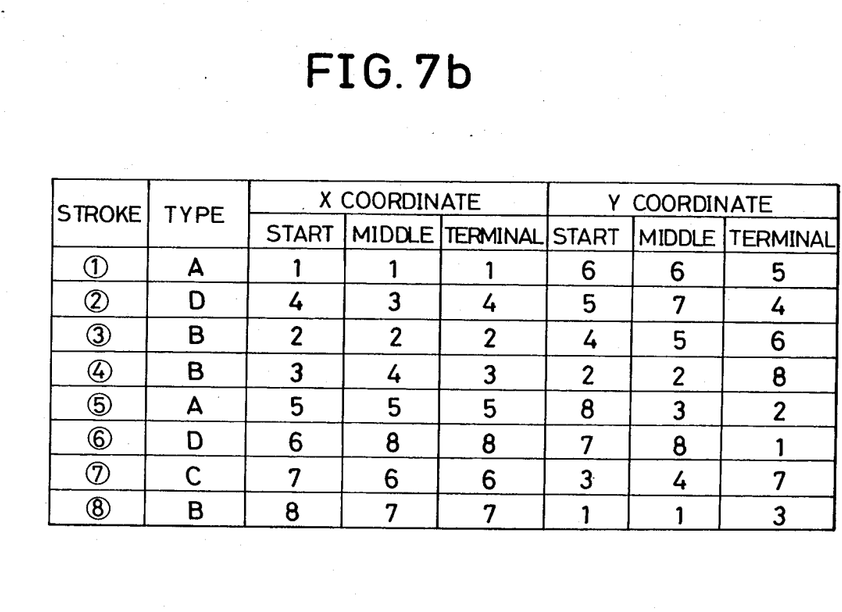
Figure 8A:
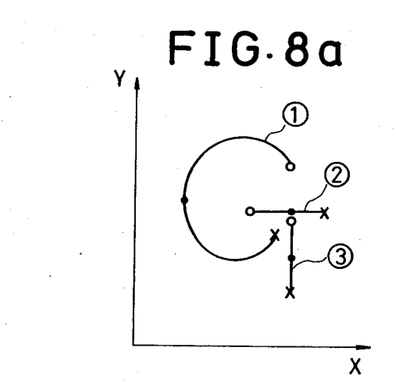
Figure 8B:
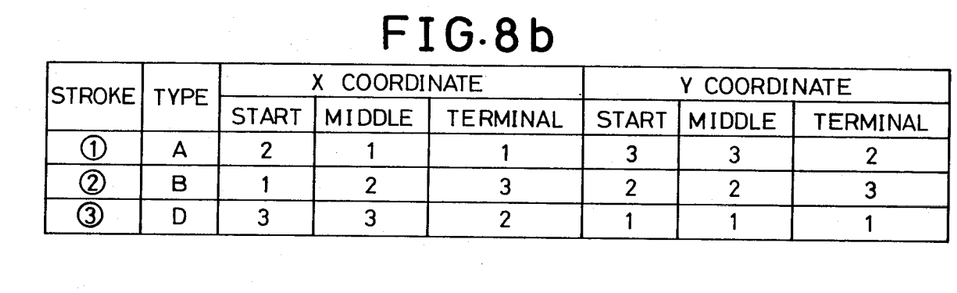
Figure 9:
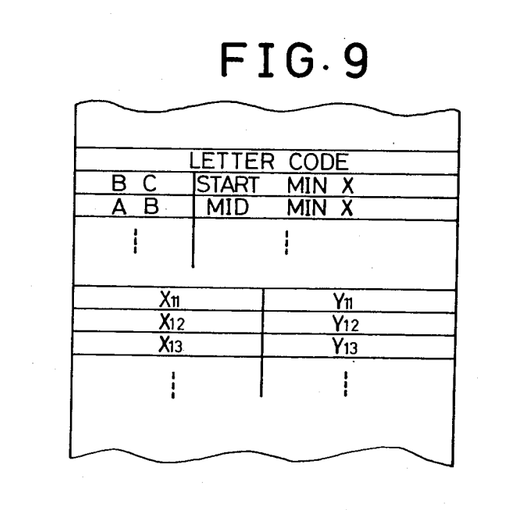
FIG. 9 is a diagram which illustrates the construction of the standard pattern dictionary and the standard pattern stroke characteristics memory section that correspond to the input pattern shown in FIGS. 6a and 6b.
Figure 10A:
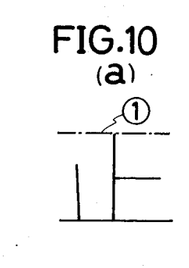
FIGS. 10(a)–10(e) are diagrams which illustrate the flow of stroke detection of a certain input pattern in accordance with the present device.
Figure 10B:
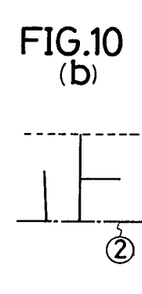
Figure 10C:
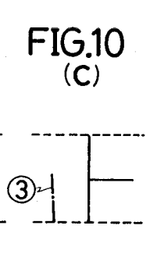
Figure 10D:
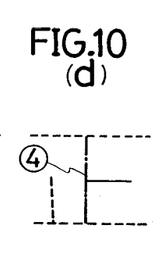
Figure 10E:
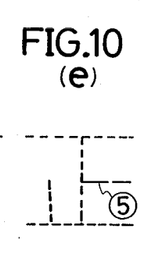

FIG. 6, FIG. 7 and FIG. 8 illustrate the information on the written strokes found for the input patterns for Chinese characters "seki;" "mei," and an English "G" that are inputted by writing, with the written strokes being numbered in accordance with the order of writing. They tabulate the characteristics of each coordinate data, for each written stroke, of the starting point, midpoint, and terminal point for the X-axis direction and the Y-axis direction for the entire input pattern, by arranging them in the order of writing. In contrast to this, in the standard pattern dictionary 8 and the standard pattern stroke characteristics memory section 22 there are registered, for example, as shown by FIG. 9, for each letter code that represents each recognition object category, the characteristic information on the standard strokes and the information on the standard patterns. The information on the standard pattern is what corresponds to the input pattern shown in FIG. 6, and similar to those used for the prior art recognition processing, describes the coordinates (X, Y) of the starting point, midpoint, and terminal point of each standard stroke. Furthermore, the characteristics information for each stroke that is a special feature of the present device is described as information on the writing direction that the stroke can take. This information shows, in the case when it·is given by (A, B), for example, that the direction of the stroke lies in (A) or (B), and in the case when it is given by (NA), that the direction of stroke lies in a division other than (A).

Figure 11:
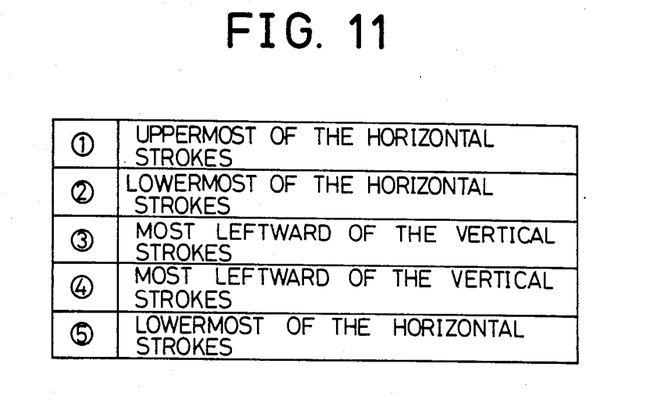
FIG. 11 is a diagram which illustrates the characteristics of the standard strokes corresponding to the input pattern shown in FIGS. 10(a)–10(e)
Figure 12:
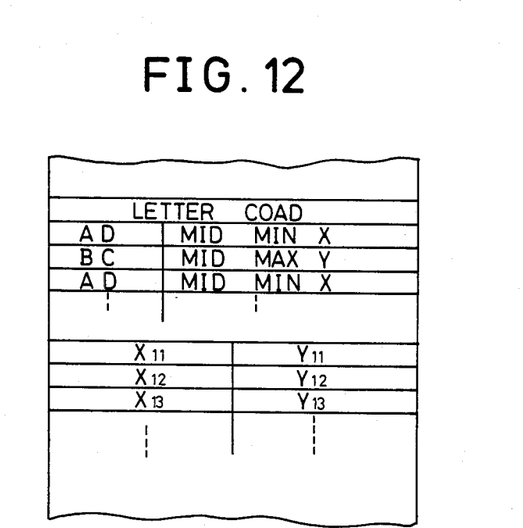
FIG. 12 is a diagram which illustrates the construction of the standard pattern dictionary and the standard pattern stroke characteristics memory section that correspond to the input pattern shown in FIGS. 8a and 8b.

Now, information on the standard strokes is stored in the order of stroke of the standard pattern that is determined, and is read in turn in accordance with the order of their storage. Then, the input strokes corresponding to the standard strokes that are read from the memory section 22 are extracted from among all of the strokes of the input pattern. After that, the corresponding strokes are removed from the input pattern, and then those corresponding to the next standard strokes are extracted from among the remaining strokes. Explaining this processing simply, the characteristic information concerning the standard stroke for the input Chinese character "sei" as shown in FIGS. 10 a–e, for example, is given in turn as directional information and a positional information of the strokes as shown by FIG. 11. In accordance with the characteristic information for the strokes, the input strokes that correspond to each of the standard strokes for the input charcater "sei" are detected, and, while removing these corresponding strokes, a detection for the input sorkes that correspond to the next standard strokes are carried out in turn. Namely, as shown by the dotted-line in FIG. 10a, the stroke corresponding to the characteristic information shown by reference ① in FIG. 11 is detected and removed, and in FIG. 10b, the stroke corresponding to the characteristic information ② is detected and removed. In the same manner, the detection and removal for the strokes corresponding to the information ③ ④ ⑤ are carried out in turn, as shown in FIGS. 10 c–e. In addition, when the corresponding strokes are not extracted, stroke detection for the next standard patterns are carried out similarly, by concluding that the standard pattern and the input pattern are unequal.

Figure 13:
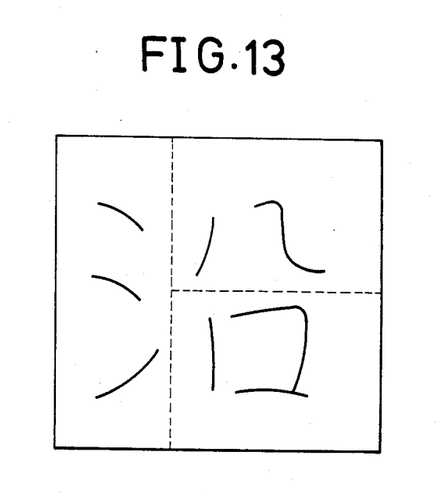
FIG. 13 is a diagram which illustrates an example of subset setting.
Figure 14:
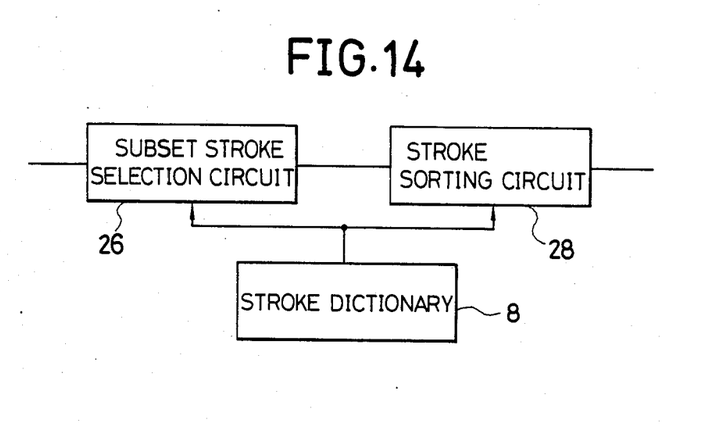
FIG. 14 is a diagram which illustrates a construction example of the circuit for processing the subset strokes.

Basically, the input strokes are rearranged in this manner in the order of srokes of the standard pattern. In the present device, the stroke processing is carried out for every one of a plurality of subsets that are subdivided and set up corresponding, for example, to radicals or pattern forms of the standard pattern. Subsets are determined, for example, for the Chinese character "en" by subdividing it into three parts as shown by FIG. 13. Then, the detection processing of strokes described in the above is carried out for each subset, and when coincidence is detected for all of the strokes in each subset, the input strokes are housed in the stroke rearranging section 24 in the order of detection. In the following, this processing is repeated in turn for a plurality of standard patterns to extract only those standard patterns that possess standard strokes coincident with each stroke of the input patterns. A series of stroke processings of this kind is executed by, for example, the processing circuits that are set up in the stroke rearranging section 24, as shown by FIG. 14. That is, the processings are accomplished by carrying out a selection processing (subset stroke selection circuit 26) for subset strokes in accordance with the stroke characteristics information that are housed in the stroke dictionary (standard pattern stroke characteristics memory section) 22, and then, by rearranging the selected strokes in accordance with the order of strokes of the standard pattern (stroke sorting circuit 28).

Figure 15:
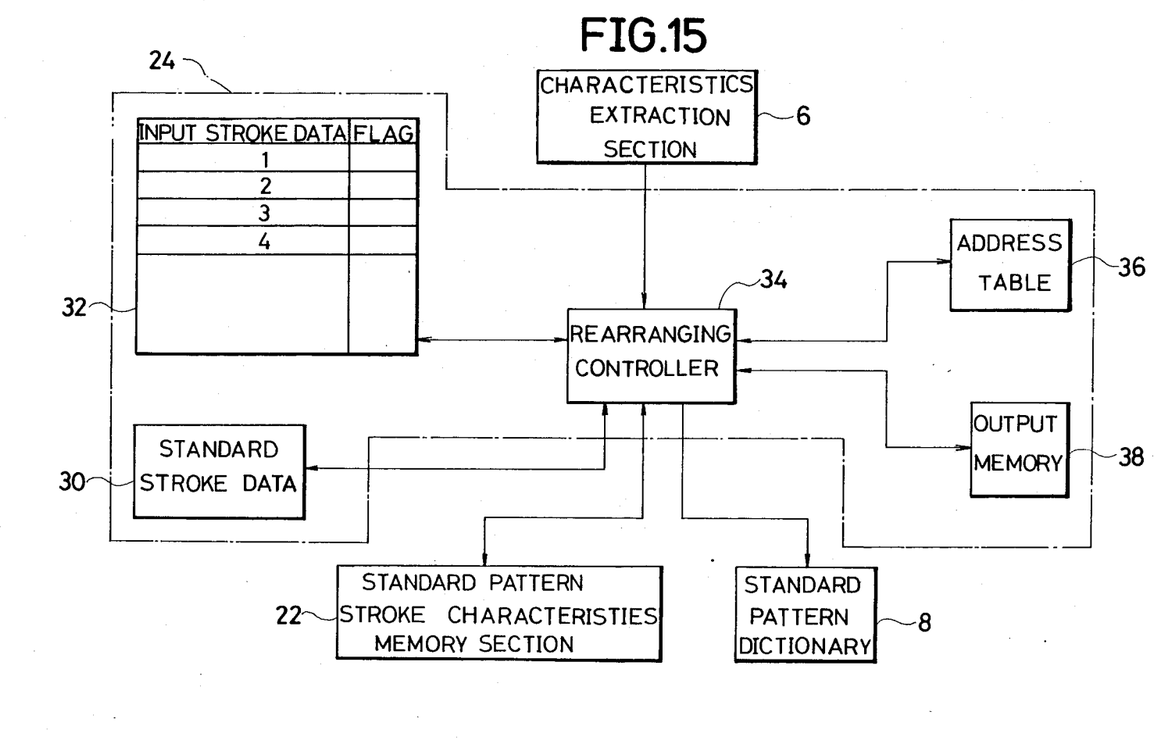
FIG. 15 is a block diagram for the stroke rearranging section of the device shown in FIG. 4.

Referring to FIG. 15, there is shown a concrete circuit construction of the stroke rearranging section 24. The concrete example of the input pattern reconstruction circuit shown here is one without the function of selection processing of the subset strokes.

The stroke rearranging section 24 includes a memory 30 for storing the standard stroke characteristics information together with the standard strokes, a memory 32 for storing the input stroke data so as to be given flags that correspond to respective data, an address table 36 which is registering the correspondence relationship between the stroke number and the category, an output memory 38 for storing the rearranaged input stroke data, and a rearranging controller 34 for carrying out a rearranging process described hereinafter.

Next, the operation of the input pattern rearranging section 24 shown in FIG. 15 will be described by referring to the flow chart shown in FIGS. 16(a) and 16(b).

Figure 16:
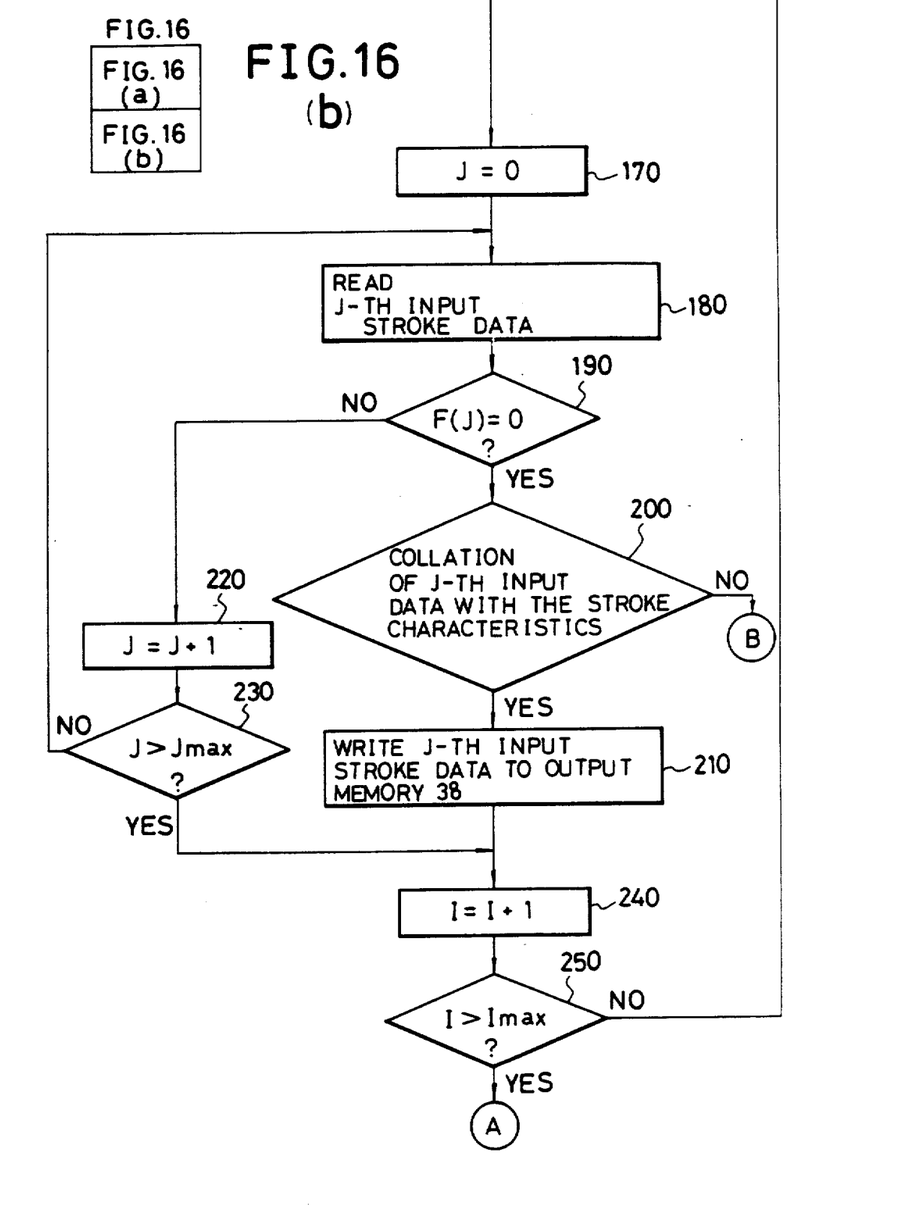
FIGS. 16(a) and 16(b) show the operation of the device of FIG. 15.
Figure 16A:
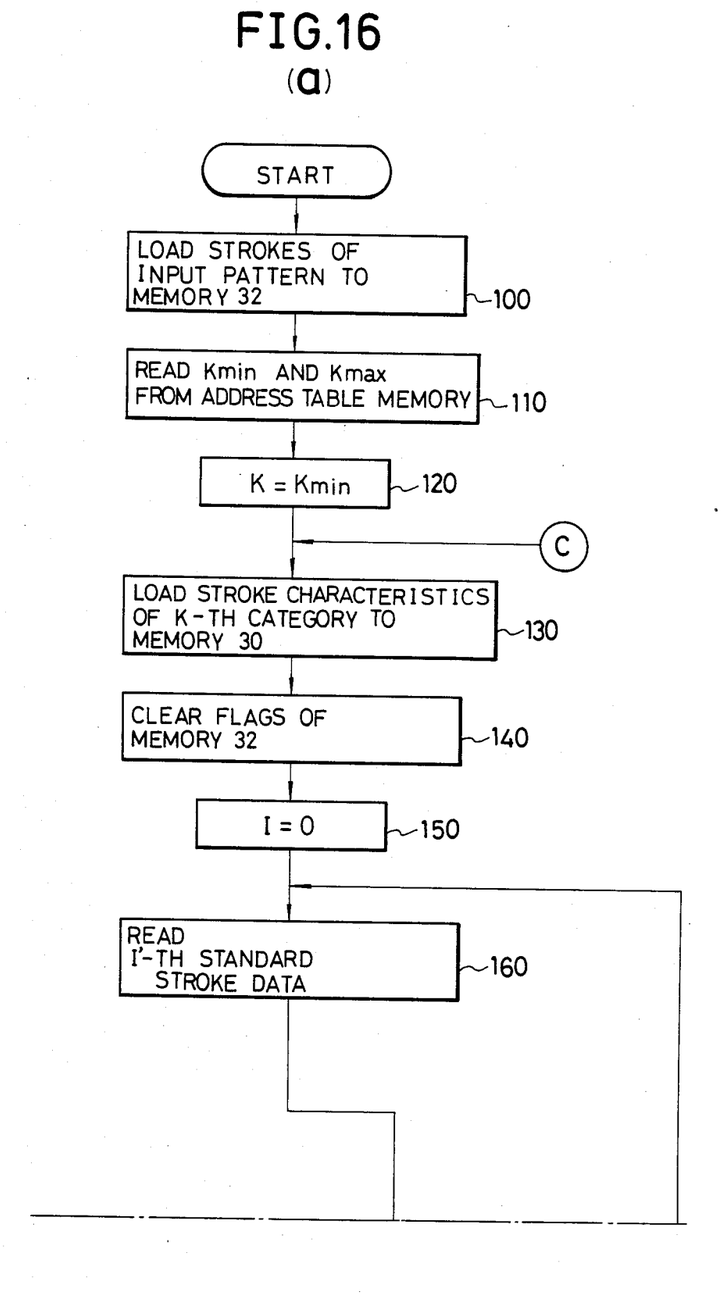

First, in step 100 of FIGS. 16(a) and 16(b), a rearranging controller 34 takes in the input pattern stroke data from the characteristics extraction section 6 to load them in the memory 32. In this step, the input stroke data are stored in the memory 32 so as to be given flags that correspond to respective data. Then, a minimum category pointer K min and a maximum category pointer K max are read by the rearranging controller 34 from the Address Table 36 which registers the correspondence relationship between the stroke number and the category (step 110). In step 120, the category pointer K of the stroke data is set at the minimum category pointer K min, and in step 130, the characteristic information on the standard strokes of the K-th category is loaded in the memory 30. Following that, the flags for the memory 32 are cleared (step 140).

Next, the standard stroke pointer I is set to zero, and the characteristics information on the I-th standard stroke is read, and further, the pointer J for the input stroke is set to zero to have the J-th input stroke data read (steps 150, 160, 170, and 180). Then, the rearranging controller 34 judges in step 190 whether its J-th flag is O or not, and when it is found to be O, that is, when the J-th input stroke data that corresponds to the J-th flag is not collated yet, a collation between the J-th input stroke data and the characteristics information on the I-th standard stroke is carried out in step 200. When the result of the collation reveals that they coincide, the J-th flag is rewritten to 1, and the information on the J-th input stroke is written in the Output Memory 38(step 210). Here, when the J-th flag is 1 in step 190, that is, when the J-th input stroke data corresponding to the J-th flag has already been collated, the (J+1)-th input stroke data is read to go through the collation processing (steps 220 and 230).

A characteristics collation for the O-th input stroke information is carried out in this manner, and the O-th input stroke information is rearranged in the Output Memory 38. Repeating a similar processing up to the I max-th (steps 240 and 250), the content of the Output Memory, namely, the rearranged input stroke data and the standard pattern for the K-th category, are transmitted to the Standard Pattern Dictionary 8 and the Standard Pattern Stroke Characteristics Memory Section 22 (steps 260 and 270). A rearranging process like that above is repeated until the category pointer K achieves K max, completing the processing (steps 280 and 290). Therefore, the input strokes that correspond to the stroke order of the standard pattern can be obtained.

Following that, a matching is carried out between the input strokes that are made to correspond, as described above, to the stroke order of the standard pattern and the strokes of the standard pattern. The collation is accomplished by contrasting the form of the stroke that is represented by each coordinate position of the starting point, midpoint, and terminal point, the positional relationship of the stroke in relation to the letter, and others, to compute the degree of similarity and the distance between the strokes. The input pattern is recognized through evaluation of the similarity between the input pattern and the standard pattern based on the degree of similarity and the distance thus found. Here, the extraction processing of the input strokes by means of the characteristics of the standard strokes may be arranged to be carried out, for example, by limiting the stroke number of the standard pattern by utilizing the information on the stroke number of the input pattern. By arranging in that way, it becomes possible to eliminate the collation processing for the standard patterns with an unequal number of strokes, saving the useless processing steps and improving the efficiency of the recognition processing.

As described in the foregoing, in accordance with the present device the input strokes that correspond to the standard strokes registered in the dictionary are extracted in turn for every subset, and are rearranged in the order of the input strokes. In addition, collation with the input pattern is carried out by selecting only standard patterns that possess standard strokes that coincide with the input strokes, so that an efficient recognition of input letter paterns can be accomplished without regard to the order of written strokes, and the number of strokes, of the input pattern. In other words, recognition of an input letter pattern becomes possible even when the input letter pattern is input by writing in an incorrect order, making it possible to improve the input efficiency by reducing the input errors.

Moreover, as described earlier, it is possible to accomplish a simple and efficient recognition processing of complicated letter pattens with large number of strokes, since the stroke detection is carried out for each subset by dividing a letter patten into a plurality of subsets. Furthermore, when the standard strokes do not correspond to the input strokes, the recognition processing for that standard stroke is interrupted at that point in time to move over to the processing for the next standard pattern. Therefore, the wastefulness in the recognition processing is reduced, and recognition of input patterns in short time and in effective manner becomes possible, bringing about an enormous practical effect such as an improvement of the processing efficiency.

It should be noted that the present invention is by no means limited to the embodiments described in the foregoing. Thus, for example, it may be arranged to give the characteristics informaton on the standard strokes of a standard pattern as a more detailed characteristic. Namely, the direction of a stroke may be arranged to be classified in a finer manner or the stroke detection may be arranged to be carried out with the addition of positional information. In addition, the characteristics of a stroke may be arranged to be given as an information on the position from the coordinate origin or on the direction for writing the stroke. In short, the present invention may be embodied in a variety of modifications as long as they do not deviate from the scope of the invention.

What is claimed is:

1. A handwritten letter recognition method for recognizing a handwritten letter which is inputted by writing, comprising the steps of:
   (a) storing stroke information and stroke order information of a candidate letter pattern;
   (b) detecting stroke information of a written letter;
   (c) reading the stroke information and stroke order information of the candidate letter pattern, and detecting in turn the stroke information of the written letter which corresponds to the stroke information of the candidate letter pattern;
   (d) rearranging the stroke information of the written letter to be in an order which corresponds to the stroke information order of the candidate letter pattern; and
   (e) processing the written letter information to identify the written letter by comparing the stroke information of the written letter to stroke information of letters having said candidate letters pattern in the order indicated by said stroke information order.

2. A handwritten letter recognition method as claimed in claim 1, in which, the stroke information and stroke pattern information for the written letter are classified and and stored for each one of a plurality of subsets, in said step (c) the stroke information for the candidate letter pattern is read in turn for each one of the subsets, and the stroke information for the written letter which corresponds to the stroke information of the candidate letter pattern is detected in turn, and, in said step (d) of said written letter which correspond to strokes of said candidate letter pattern are rearranged in the order of said stroke order information.

3. A handwritten letter recognition method as claimed in claim 2, in which the subsets are determined by partitioning the standard pattern of the recognition object letter in accordance with the formal characteristics of the standard pattern.

4. A handwritten letter recognition method as claimed in claim 1, in which the stroke information of the candidate letter pattern includes information on the direction and information on the position of each stroke.

5. A handwritten letter recognition method as claimed in claim 1, in which, in said step (a), the stroke information comprises the direction of each written stroke and the position coordinates of the starting point, midpoint, and terminal point of each written stroke.

6. A handwritten letter recognition method as claimed in claim 1, further where step (c) comprises:
   memorizing the order of the stroke information of strokes of the written letter which corresponds to strokes of said candidate letter pattern.

7. A handwritten letter recognition device for recognizing a handwritten letter which is inputted by writing, comprising:
   means for detecting stroke information of a written letter pattern;
   a standard pattern dictionary which stores stroke information and stroke order information of a plurality of candidate letter patterns;
   means for arranging the stroke information of the written letter to correspond to the order of the stroke order information of one of the candidate letter patterns; and
   means for recognizing said written letter by comparing the stroke information of said written letter to stroke information of letters having said one of said candidate letter pattern in the order of said stroke order information of said candidate letter pattern.

* * * * *

UNITED STATES PATENT AND TRADEMARK OFFICE
CERTIFICATE OF CORRECTION

PATENT NO. : 4,685,142

DATED : August 4, 1987

INVENTOR(S) : Katsunori Ooi, et al

It is certified that error appears in the above-identified patent and that said Letters Patent is hereby corrected as shown below:

Figure 16(b) should be added as shown on the attached sheet.

Signed and Sealed this

Twenty-ninth Day of March, 1988

Attest:

DONALD J. QUIGG

*Attesting Officer*  *Commissioner of Patents and Trademarks*